United States Patent
Ota

(10) Patent No.: US 11,359,550 B2
(45) Date of Patent: Jun. 14, 2022

(54) BLEED-OFF VALVE DRIVE CONTROLLER FOR AIRCRAFT GAS TURBINE ENGINE

(71) Applicant: Honda Motor Co., Ltd., Tokyo (JP)

(72) Inventor: Akira Ota, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 345 days.

(21) Appl. No.: 16/814,525

(22) Filed: Mar. 10, 2020

(65) Prior Publication Data

US 2020/0347789 A1 Nov. 5, 2020

(30) Foreign Application Priority Data

Mar. 15, 2019 (JP) .............................. JP2019-048071

(51) Int. Cl.
*F02C 9/18* (2006.01)
*B64D 31/06* (2006.01)
*B64D 27/10* (2006.01)
*F04D 27/02* (2006.01)
*F01D 17/24* (2006.01)
*F01D 17/10* (2006.01)

(52) U.S. Cl.
CPC ............... *F02C 9/18* (2013.01); *B64D 27/10* (2013.01); *B64D 31/06* (2013.01); *F01D 17/105* (2013.01); *F01D 17/24* (2013.01); *F04D 27/0215* (2013.01); *F04D 27/0223* (2013.01); *F04D 27/0207* (2013.01); *F05D 2270/62* (2013.01)

(58) Field of Classification Search
CPC ..... B64D 31/06; B64D 27/10; F04D 27/0207; F04D 27/0215; F04D 27/0223; F01D 17/105; F01D 17/24; F05D 2270/62; F02C 9/18
See application file for complete search history.

(56) References Cited

U.S. PATENT DOCUMENTS

2014/0245747 A1   9/2014   Pritchard, Jr. et al.

FOREIGN PATENT DOCUMENTS

JP     2007113427 A   *   5/2007
RU     2674824 C1     *  12/2018  ............. F16K 31/04

* cited by examiner

*Primary Examiner* — J. Todd Newton
*Assistant Examiner* — Jesse M Prager
(74) *Attorney, Agent, or Firm* — Duft & Bornsen, PC

(57) ABSTRACT

In an aircraft gas turbine engine equipped with a bleed-off valve that bleeds intake air compressed by a compressor exterior and an electric actuator that drives the valve when current is supplied, a required valve opening θr and a current value Ia corresponding thereto are calculated and Ia is supplied to the actuator to bring valve opening θ to the required opening θr. Then Ia is compared with a current value Ib and if Ia exceeds 1*b*, the valve is estimated to have failed and another current value Ic is calculated and Ic is supplied to enlarge valve opening toward wide-opening θw. Then a current value Id is calculated and supplied to decrease valve opening toward θr. Next, Id is compared with Ib and the valve is determined normal when Id is equal to or smaller than 1*b*. If not, it is determined to be faulty.

18 Claims, 3 Drawing Sheets

BLEED-OFF VALVE DRIVE CONTROLLER FOR AIRCRAFT GAS TURBINE ENGINE

CROSS-REFERENCE TO RELATED APPLICATION

This application is based upon and claims the benefit of priority from Japanese Patent Application No. 2019-048071 filed on Mar. 15, 2019, the contents of which are incorporated herein by reference.

BACKGROUND OF THE INVENTION

Field of the Invention

This invention relates to a bleed-off valve drive controller for an aircraft gas turbine engine.

An aircraft gas turbine engine is equipped with at least a single spool compressor and turbine, obtains thrust from output generated by driving the turbine with high-temperature, high-pressure gas produced by combusting fuel with compressor-compressed intake air in a combustion chamber, and is equipped with a bleed-off valve that bleeds intake air compressed by the compressor to the exterior.

Compressor surge occurring in such a gas turbine engine is relieved in the manner of the technology of United States Patent Application Publication No. 2014/0245747 by moving the bleed-off valve in opening direction to bleed off compressed intake air to the exterior.

Although surging can thus be relieved by opening the bleed-off valve, foreign matter entrained by intake air and/or generated by the engine are apt to adhere to the bleed-off valve and impair its movement as accretion increases. Moreover, bleed-off valve movement may also be degraded owing to deterioration/wear of its bearings or of sliding parts of an actuator for open-close driving the bleed-off valve.

The object of this invention is therefore to overcome the aforesaid problem by providing a bleed-off valve drive controller for an aircraft gas turbine engine adapted to prevent degradation of bleed-off valve movement by detecting adhesion of foreign matter to the bleed-off valve.

In order to achieve the object, this invention provides in one aspect a bleed-off valve drive controller for an aircraft gas turbine engine equipped with at least: a single spool compressor and turbine which obtains thrust from output generated by driving the turbine with high-temperature, high-pressure gas produced by combusting fuel with compressor-compressed intake air in a combustion chamber; a bleed-off valve that bleeds intake air compressed by the compressor exterior; an electric actuator that drives the bleed-off valve to open or close when current is supplied; and a control unit that controls supply of current to the electric actuator; wherein the control unit comprises: a required valve opening current supply instructing unit configured to calculate a required valve opening $\theta r$ required under operating condition of the engine and a current value Ia corresponding to the required valve opening $\theta r$, and instruct current supply to the electric actuator based on the calculated current value Ia so as to bring opening $\theta$ of the bleed-off valve to the calculated required opening $\theta r$; a bleed-off valve failure estimating unit configured to compare the current value Ia with a predetermined current value Ib, estimate that the bleed-off valve has failed if the current value Ia exceeds the predetermined current value 1b, calculate a current value Ic when the bleed-off valve is estimated to have failed and instruct current supply to the electric actuator based on the calculated current Ic so as to enlarge opening $\theta$ of the bleed-off valve toward wide-open opening $\theta w$; a decreasing valve opening current supply instructing unit configured to calculate a current value Id and instruct current supply to the electric actuator based on the calculated current value Id so as to decrease opening $\theta$ of the bleed-off valve from wide-open opening $\theta w$ toward the calculated required opening $\theta r$; and a bleed-off valve failure determining unit configured to compare the supplied current value Id with a predetermined current value Ib and determine the bleed-off valve normal when the supplied current value Id is equal to or smaller than the predetermined current value 1b.

BRIEF DESCRIPTION OF THE DRAWINGS

The objects and advantages of the present invention will become clearer from the following description of embodiment in relation to the attached drawings, in which.

DETAILED DESCRIPTION OF THE INVENTION

There now follows an explanation with reference to the attached drawings of an embodiment for implementing the bleed-off valve drive controller for an aircraft gas turbine engine according to the present invention.

Figure 1:
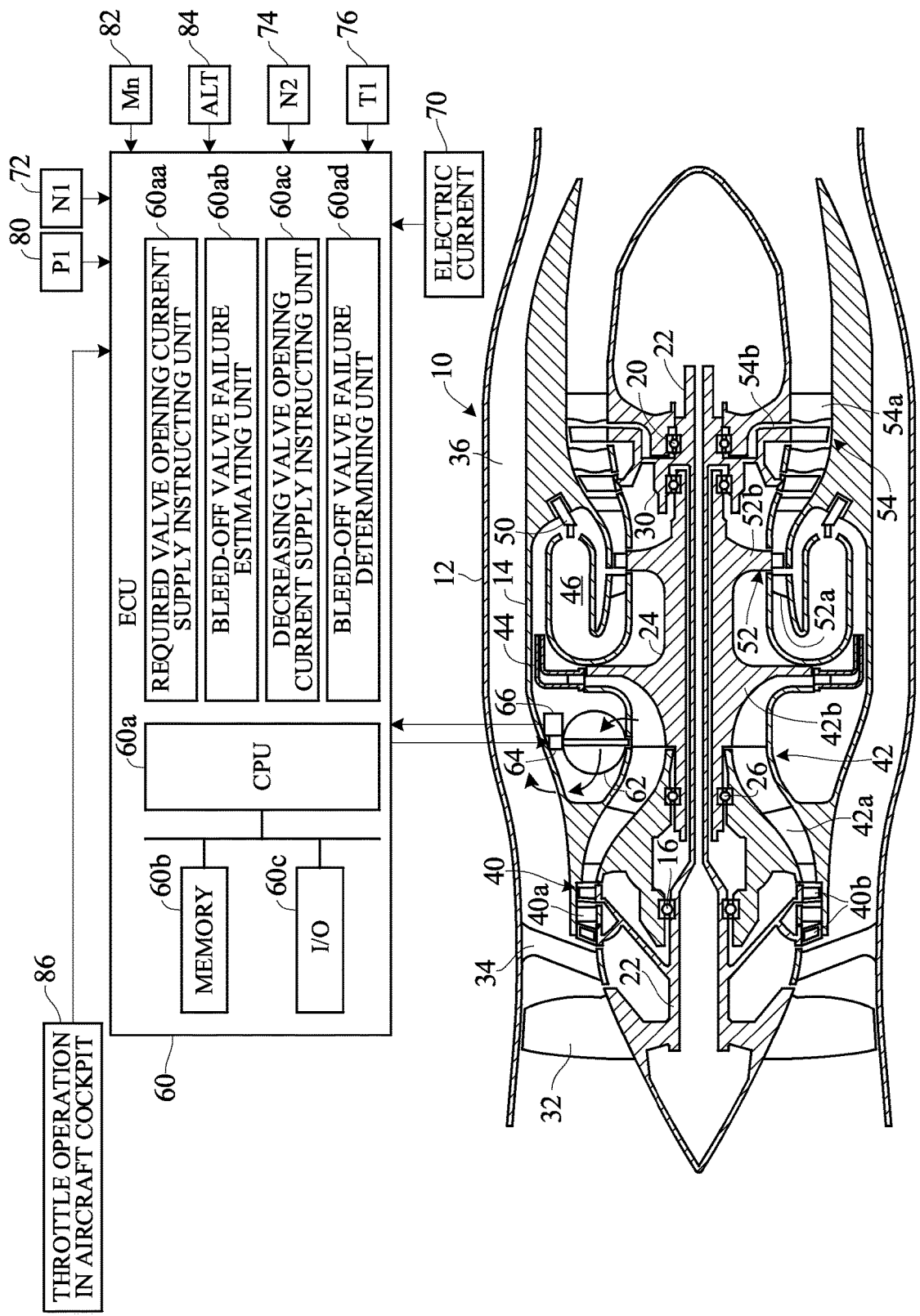
FIG. 1 is schematic diagram showing an overview of the bleed-off valve drive controller for an aircraft gas turbine engine.

FIG. 1 is schematic diagram showing an overview of the bleed-off valve drive controller for an aircraft gas turbine engine.

Four types of gas-turbine engines are known: turbojet, turbofan, turboprop and turboshaft. A two-spool turbofan engine is taken as an example in the following explanation.

In FIG. 1, this turbofan engine, namely, the aircraft gas turbine engine proper (hereinafter called simply "engine") is designated by reference numeral 10. The engine 10 is fastened to an airframe (not shown) of the aircraft and is equipped with an outer casing 12 and an inner casing 14. A low-pressure system shaft 22 is rotatably supported on inner side of the inner casing 14 through bearings 16 and 20.

A cylindrical high-pressure system shaft 24 is rotatably and coaxially fitted on an axially intermediate part of outer periphery of the low-pressure system shaft 22. The high-pressure system shaft 24 is rotatably supported on the inner casing 14 through a bearing 26 at its front end and rotatably supported on the low-pressure system shaft 22 through a bearing 30 at its rear end.

A fan 32 is fixed on front end of the low-pressure system shaft 22 and of air sucked in here part passes through a fan stator 34 installed between the outer casing 12 and the inner casing 14, part passes through and flows out rearward from an annular bypass duct 36 located between the outer casing 12 and the inner casing 14, and the remainder flows into an axial low-pressure compressor 40 and a centrifugal high-pressure compressor 42 installed inside the inner casing 14.

The low-pressure compressor 40 has stator vanes 40a fixed inside and compressor blades provided on outer periphery of the inner casing 14, and is equipped with a low-pressure compressor wheel 40b fixed on the low-pressure system shaft 22.

Similarly, the high-pressure compressor 42 has stator vanes 42a fixed inside the inner casing 14 and compressor blades on its outer periphery, and is equipped with a high-pressure compressor wheel 42b fixed on the high-pressure system shaft 24.

A combustion chamber 46 is installed behind a diffuser 44 connected to outer periphery of the high-pressure compressor wheel 42b and is provided with a plurality of fuel injection nozzles 50 that inject compressed fuel from a fuel supply system thereinto. In the combustion chamber 46, injected fuel is mixed with air and combusted, and combustion gas generated by the combustion is supplied to a high-pressure turbine 52 and a low-pressure turbine 54.

The high-pressure turbine 52 has nozzle guide vanes 52a fixed inside and turbine blades provided on outer periphery of the inner casing 14, and is equipped with a high-pressure turbine wheel 52b fixed on the high-pressure system shaft 24.

Similarly, the low-pressure turbine 54 has nozzle guide vanes 54a fixed inside and turbine blades provided on outer periphery of the inner casing 14, and is equipped with a low-pressure turbine wheel 54b fixed on the low-pressure system shaft 22.

When the high-pressure system shaft 24 is driven by a starter motor (not shown), air sucked in by the high-pressure compressor wheel 42b is supplied to the combustion chamber 46 to be mixed with fuel and combusted, and so-generated combustion gas drives the high-pressure turbine wheel 52b and the low-pressure turbine wheel 54b.

As the low-pressure system shaft 22 and the high-pressure system shaft 24 therefore rotate, air compressed by the fan 32, the low-pressure compressor wheel 40b and the high-pressure compressor wheel 42b is supplied to the combustion chamber 46, whereby driving of the engine 10 continues.

During operation of the engine 10, part of the air sucked in by the fan 32 is jetted rearward through the bypass duct 36 to impart thrust to the aforesaid airframe. Moreover, the remainder of the air sucked in by the fan 32 is combusted with fuel in the combustion chamber 46 and after driving the low-pressure system shaft 22 and the high-pressure system shaft 24 is jetted rearward also to impart thrust to the aforesaid frame.

An ECU (Electronic Control Unit) 60 is installed near the engine 10. The ECU 60 is equipped with a microcomputer comprising at least one processor CPU 60a, at least one memory 60b (more specifically ROM, RAM) coupled to the processor 60a, and an I/O unit 60c and is housed in a container mounted near the engine 10. As explained later, the processor 60a is configured to function as a required valve opening current supply instructing unit 60aa, a bleed-off valve failure estimating unit 60ab, a decreasing valve opening current supply instructing unit 60ac and a bleed-off valve failure determining unit 60ad.

Further, a bleed-off valve 62 that bleeds off intake air compressed by the low-pressure compressor 40 and the high-pressure compressor 42 to the exterior is provided in a passage downstream of the stator vanes 42a of the high-pressure compressor 42 following the low-pressure compressor 40.

The bleed-off valve 62 is, for example, a butterfly valve driven to open/close by an electric actuator 64, namely, a DC motor, connected to its shaft. A valve element (butterfly) of the bleed-off valve 62 is structured so that its gap is smallest at valve closed position.

The electric actuator 64 is connected to a drive circuit (not shown) in the ECU 60, and when the ECU 60 sends a current supply instruction, the electric actuator 64 is applied with driving current from a battery (not shown) thereto through a drive circuit.

When the bleed-off valve 62 is opened, intake air flows as indicated by arrows, through holes (not shown) to be bled from the bypass duct 36 to outside the engine 10. A valve position sensor 66 is provided in association with the electric actuator 64 to detect opening angle θ of the bleed-off valve 62.

Although not illustrated in detail, a group of various sensors are installed at suitable positions of the engine 10, including but not limited to an N1 sensor 72 that detects rotational speed N1 of the low-pressure turbine 54, an N2 sensor 74 that detects rotational speed N2 of the high-pressure turbine 52, a T1 sensor 76 that detects temperature T1 of intake air, a P1 sensor 80 that detects pressure P1 of intake air, an Mn sensor 82 that detects aircraft speed Mn (Mach number), and an ALT sensor 84 that detects aircraft altitude ALT.

Outputs of these sensors are sent to the ECU 60. In addition, signals indicating throttle operation (throttle lever position) by the pilot are sent to the ECU 60 from the aircraft cockpit side 86.

Figure 2:
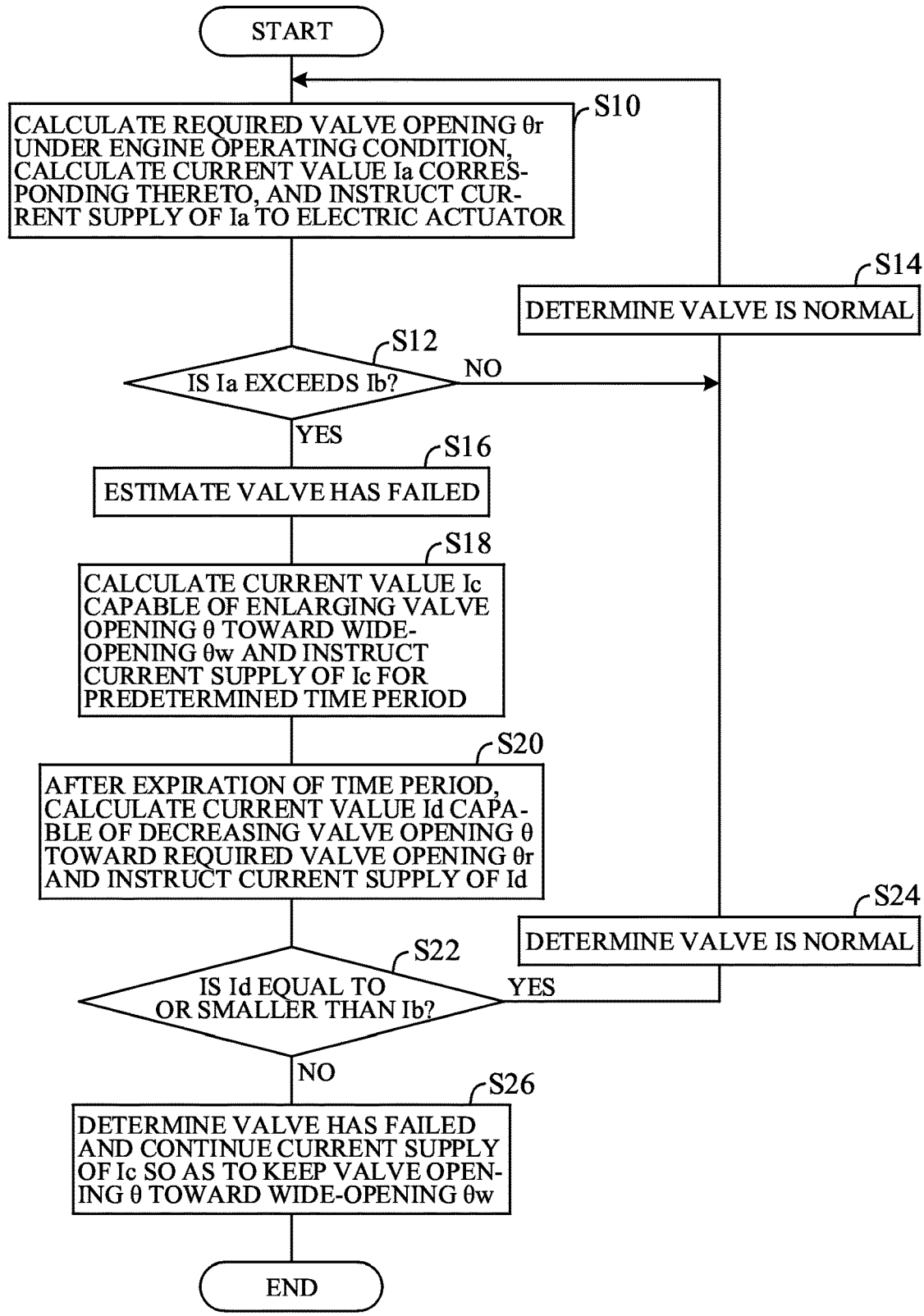
FIG. 2 is a flowchart explaining operations of the bleed-off valve drive controller illustrated in FIG. 1.

FIG. 2 is a flowchart explaining actions of the bleed-off valve drive controller, specifically, showing processing performed by the ECU 60. The indicated processing is performed when the aircraft incorporating the engine 10 is on the ground or when in flight.

Now explaining the flowchart, in S10 (S: processing Step), required valve opening θr required under operating condition of the engine detected by the N1 sensor 72, etc., is calculated, and current value Ia corresponding to the required valve opening θr is calculated in accordance with preset characteristics (explained later). Then supply of current to the electric actuator 64 is instructed based on the calculated current value Ia so as to bring opening θ of the bleed-off valve 62 to calculated required opening θr.

Figure 3:
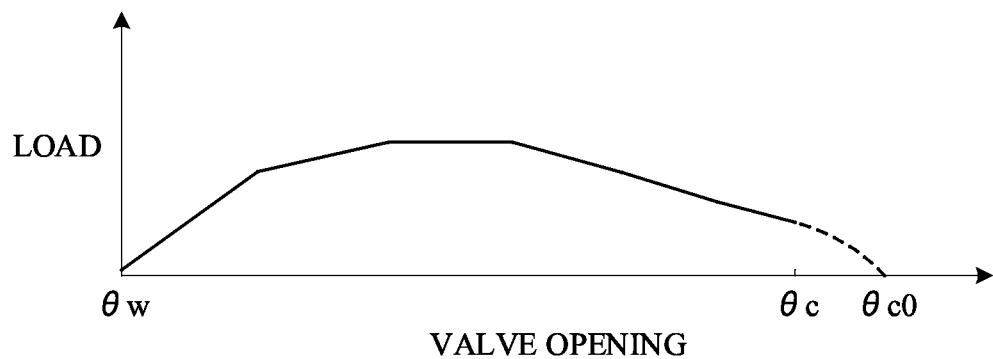
FIG. 3 is a characteristic diagram showing load corresponding to opening of a bleed-off valve illustrated in FIG. 1.

FIG. 3 is a characteristic diagram showing load corresponding to opening θ of the bleed-off valve 62 (pressure of intake air acting on the bleed-off valve 62). As illustrated, load is highest when the bleed-off valve 62 is at opening near half-open value and decreases toward full-closed opening θc and toward wide-open opening θw. It should be noted that, although FIG. 3 shows full-closed opening θc0, full-closed opening θc of the bleed-off valve 62 is defined not to be opening θc0 but to be an opening slightly short of full-closed in this embodiment.

Figure 4:
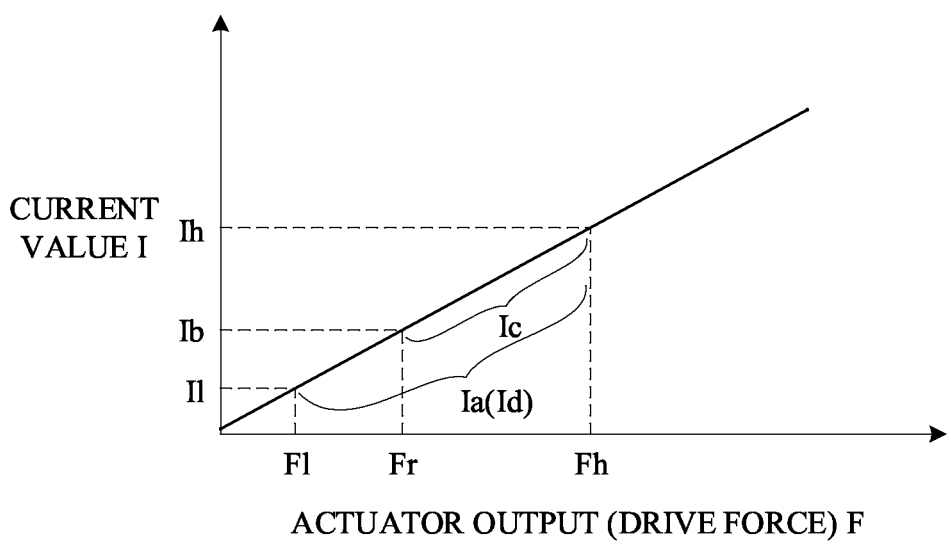
FIG. 4 is an explanatory diagram showing characteristic of current value with respect to output of an electric actuator illustrated in FIG. 1.

FIG. 4 is an explanatory diagram showing the aforesaid preset characteristic of current value with respect to output of the electric actuator 64 (which corresponds to open-close drive force of the bleed-off valve 62) F, in such a manner that current value increases with increasing output of the electric actuator 64. In FIG. 4, current value corresponding to minimum drive force Fl is defined as Il, current value corresponding to reference drive force Fr as Ib (predetermined current value), and current value corresponding to maximum drive force Fh structurally achievable by the electric actuator 64 as Ih. In addition, current value corresponding to required opening θr under normal condition is set about midway between current values Il and 1b. Current value Ia calculated in S10 is therefore also calculated to fall between current values Il and 1b.

Returning to the flowchart of FIG. 2, next, in S12, instructed current value Ia is compared with the predetermined current value Ib, and it is determined whether current value Ia exceeds current value 1b.

In S10 the current value Ia is calculated and determined to converge opening θ of the bleed-off valve 62 detected by the valve position sensor 66 on required opening θr. Accordingly, the calculated value Ia should, as discussed in the following, normally be smaller than 1b insofar as no adhered foreign matter is present. The result in S12 is therefore ordinarily NO and the bleed-off valve 62 is determined to be normal in ensuing S14. In other words, it is determined that no foreign matter is adhered, or any sliding parts such as bearings of the bleed-off valve 62 and parts of the electric actuator 64 are free of deterioration.

In contrast, when the result in S12 is YES, the program goes to S16, in which the bleed-off valve is estimated to have failed (due to adhesion or accretion of foreign matter or deterioration of sliding parts). The reasoning here is that since calculated current value 1a should normally fall between Il and Ib, the fact of its exceeding predetermined value 1b is most likely due to increase in energizing current supplied to the electric actuator (DC motor) 64 owing to increase in mechanical resistance during opening and closing caused by adhesion of foreign matter between the valve element and inner surface of passages of the bleed-off valve 62 and/or owing to degradation of sliding parts of the electric actuator 64.

In the flowchart of FIG. 2, next, in S18, current value Ic capable of enlarging opening θ of the bleed-off valve 62 toward wide-open opening θw (more precisely enlarging opening θ of the bleed-off valve 62 to wide-open opening θw) is calculated and current supply to the electric actuator 64 is instructed based on the calculated current Ic for a predetermined time period. The current value Ic is calculated as a value exceeding predetermined current value Ib. In other words, against the backdrop of foreign matter adhesion having been estimated, these measures are taken to energize the electric actuator 64 to bring opening θ of the bleed-off valve 62 toward wide-open opening θw so that adhered matter can be blown away with compressed intake air.

Next, in S20, after expiration of the predetermined time period, current value Id capable of decreasing opening θ of the bleed-off valve 62 from wide-open opening θw toward the aforesaid required opening θr (more specifically current value Id capable of bringing the opening θ of the valve 62 to the required opening θr) is calculated and current supply to the electric actuator 64 is instructed based on the calculated current value Id after expiration of the predetermined time period. The current value Id is basically similar to current value 1a and is calculated to fall between Il and Ih in FIG. 4.

Next, in S22, it is determined whether current value Id is equal to smaller than the current value Ib and when the result in S22 is YES, the program goes to S24, in which the bleed-off valve 62 is determined to be normal (removed of foreign matter if once adhered).

On the other hand, when the result in S22 is NO, the program goes to S26, in which the bleed-off valve 62 is determined still to be faulty (determined to have failed) and supply of current to the electric actuator 64 at the value Ic is continued, more exactly, supply of current at value Ic is continued in order to keep opening θ of the bleed-off valve 62 toward wide-open opening θw.

As stated in the above, the embodiment is configured to have a bleed-off valve drive controller for an aircraft gas turbine engine (10) equipped with at least: a single spool compressor (40 (42)) and turbine (54 (52)) which obtains thrust from output generated by driving the turbine with high-temperature, high-pressure gas produced by combusting fuel with compressor-compressed intake air in a combustion chamber (46); a bleed-off valve (62) that bleeds intake air compressed by the compressor exterior; an electric actuator (64) that drives the bleed-off valve to open or close when current is supplied; and a control unit (ECU 60) that controls supply of current to the electric actuator; wherein the control unit comprises: a required valve opening current supply instructing unit (60*aa*, S10) configured to calculate a required valve opening θr required under operating condition of the engine and a current value Ia corresponding to the required valve opening θr, and instruct current supply to the electric actuator based on the calculated current value Ia so as to bring opening θ of the bleed-off valve to the calculated required opening θr; a bleed-off valve failure estimating unit (60*ab*, 60*ab*, S12, S16, S18) configured to compare the current value Ia with a predetermined current value Ib, estimate that the bleed-off valve has failed if the current value Ia exceeds the predetermined current value 1b, calculate a current value Ic when the bleed-off valve is estimated to have failed and instruct current supply to the electric actuator (64) based on the calculated current Ic so as to enlarge opening θ of the bleed-off valve toward wide-open opening θw; a decreasing valve opening current supply instructing unit (60*ac*, S20) configured to calculate a current value Id and instruct current supply to the electric actuator based on the calculated current value Id so as to decrease opening θ of the bleed-off valve from wide-open opening θw toward the calculated required opening θr; and a bleed-off valve failure determining unit (60*ad*, S22, S24, S26) configured to compare the supplied current value Id with a predetermined current value Ib and determine the bleed-off valve normal when the supplied current value Id is equal to or smaller than the predetermined current value Ib.

Thus, the ECU (control unit) 60 of the controller according to this embodiment is configured to have the required valve opening current supply instructing unit (60*aa*, S10), the bleed-off valve failure estimating unit (60*ab*, S12, S16, S18), the decreasing valve opening current supply instructing unit (60*ac*, S20) and the bleed-off valve failure determining unit (60*ad*, S22, S24, S26).

In the controller, the control unit (ECU 60) is an electronic control unit that is constituted of a microcomputer equipped with at least a processor (60*a*) and a memory (60*b*) coupled to the processor, and the processor is configure to function as those mentioned with the units 60*aa* to 60*ad*. In the method, the processor is also configure to function as those mentioned with the units 60*aa* to 60*ad* in the controller.

In the gas turbine engine bleed-off valve drive controller according to this embodiment, degradation of bleed-off valve 62 movement can therefore be prevented by controlling drive of the bleed-off valve 62 to remove detected foreign matter adhering to the bleed-off valve 62. Moreover, deterioration of bearings of the bleed-off valve 62 and sliding parts of the electric actuator 64 can be detected to enable component replacement prior to failure, which is also effective for preventing degradation of bleed-off valve 62 movement. In addition, since any foreign matter adhering to the bleed-off valve 62 can be removed, adverse effects of surging and/or performance decrement of the low-pressure compressor 40 and high-pressure compressor 42 can be held to minimum, while fuel efficiency caused by excessive bleed-off and overheating caused by decreased air flow to the combustion chamber 46 can also be prevented.

Further, the bleed-off valve failure determining unit determines that the bleed-off valve 62 has failed when the supplied current value Id exceeds the predetermined current value 1*b*, and continues supply of current to the electric actuator 64 at the current value Ic. With this, in addition to the aforesaid effects and advantages, the bleed-off valve 62 is forcibly opened by the supply of current of value Ic, thereby ensuring reliable avoidance of surging even when foreign matter cannot be removed.

Moreover, the bleed-off valve failure determining unit continues supply of current so as to keep opening θ of the bleed-off valve to wide-open opening θw when it is determined that the bleed-off valve has failed (60*ad*, S22, S26). With this, in addition to the aforesaid effects and advantages, surging can be still more reliably avoided.

Moreover, the bleed-off valve failure estimating unit instructs current supply to the electric actuator based on the calculated current Ic for a predetermined time period (60*ab*, S18), and the decreasing valve opening current supply instructing unit calculates current value Id and instructs the current supply to the electric actuator based on the calculated current value Id after expiration of the predetermined time period (60*ac*, S20). With this, in addition to the aforesaid effects and advantages, opening θ of the bleed-off valve can surely be decreased from wide-open opening θw to the calculated required opening θr surging.

Moreover, the required valve opening current supply instructing unit and the bleed-off valve failure estimating unit calculates the current value Ia and current value Ic in accordance with characteristics preset with respect to output of the electric actuator (60*aa*, S10, 60*ab*, S18). With this, in addition to the aforesaid effects and advantages, the current values can be calculated properly.

Moreover, the characteristics is preset with respect to output of the electric actuator 64 in such a manner that current value increases with increasing output of the electric actuator (FIG. 4). With this, in addition to the aforesaid effects and advantages, the current values can be calculated more properly.

Although the bleed-off valve 62 is exemplified as a butterfly valve in the foregoing description, this is not a limitation and the bleed-off valve can be of any structure insofar as capable of bleeding off compressed intake air. And while the electric actuator 64 is configured as a DC motor, it can be of any structure capable of open-close driving the bleed-off valve 62 under energization by current of controlled value.

Although the engine 10 is exemplified as a two-spool turbofan engine, it is not limited to such and can alternatively be a single-spool turbofan engine. In addition, a turbojet engine, turboprop engine or turboshaft can be adopted as the engine 10.

While the present invention has been described with reference to the preferred embodiments thereof, it will be understood, by those skilled in the art, that various changes and modifications may be made without departing from the scope of the appended claims.

What is claimed is:

1. A bleed-off valve drive controller arrangement for an aircraft gas turbine engine, the arrangement comprising:
   a single spool compressor and turbine which obtains thrust from output generated by driving the turbine with high-temperature, high-pressure gas produced by combusting fuel with compressor-compressed intake air in a combustion chamber;
   a bleed-off valve that bleeds the intake air compressed by the compressor exterior;
   an electric actuator that drives the bleed-off valve to open or close when current is supplied; and
   a control unit that controls a supply of current to the electric actuator;
   wherein the control unit comprises:
   a required valve opening current supply instructing unit configured to calculate a required valve opening θr required under an operating condition of the engine and a current value Ia corresponding to the required valve opening θr, and instruct current supply to the electric actuator based on the calculated current value Ia so as to bring an opening θ of the bleed-off valve to the calculated required valve opening θr;
   a bleed-off valve failure estimating unit configured to compare the current value Ia with a predetermined current value Ib, estimate that the bleed-off valve has failed if the current value Ia exceeds the predetermined current value Ib, calculate a current value Ic when the bleed-off valve is estimated to have failed and instruct current supply to the electric actuator based on the calculated current value Ic so as to enlarge the opening θ of the bleed-off valve toward a wide-open opening θw;
   a decreasing valve opening current supply instructing unit configured to calculate a current value Id and instruct current supply to the electric actuator based on the calculated current value Id so as to decrease the opening θ of the bleed-off valve from the wide-open opening θw toward the calculated required valve opening θr; and
   a bleed-off valve failure determining unit configured to compare the supplied current value Id with the predetermined current value Ib and determine the bleed-off valve is normal when the supplied current value Id is equal to or smaller than the predetermined current value Ib.

2. The controller according to claim 1, wherein the bleed-off valve failure determining unit determines that the bleed-off valve has failed when the supplied current value Id exceeds the predetermined current value Ib, and continues the supply of current to the electric actuator at the current value Ic.

3. The controller according to claim 2, wherein the bleed-off valve failure determining unit continues the supply of current so as to keep the opening θ of the bleed-off valve to the wide-open opening θw when it is determined that the bleed-off valve has failed.

4. The controller according to claim 1, wherein the bleed-off valve failure estimating unit instructs current supply to the electric actuator based on the calculated current value Ic for a predetermined time period, and the decreasing valve opening current supply instructing unit calculates the current value Id and instructs the current supply to the electric actuator based on the calculated current value Id after expiration of the predetermined time period.

5. The controller according to claim 1, wherein the required valve opening current supply instructing unit and the bleed-off valve failure estimating unit calculates the current value Ia and the current value Ic in accordance with the electric actuator.

6. The controller according to claim 5, wherein current value increases with increasing output of the electric actuator.

7. A bleed-off valve drive controller arrangement for an aircraft gas turbine engine, the arrangement comprising:
   a single spool compressor and turbine which obtains thrust from output generated by driving the turbine with high-temperature, high-pressure gas produced by combusting fuel with compressor-compressed intake air in a combustion chamber;
a bleed-off valve that bleeds the intake air compressed by the compressor exterior;
an electric actuator that drives the bleed-off valve to open or close when current is supplied; and
an electronic control unit that controls a supply of current to the electric actuator;
wherein the electronic control unit is constituted of a microcomputer equipped with at least a processor and a memory coupled to the processor, and the processor is configured to:
calculate a required valve opening θr required under an operating condition of the engine and a current value Ia corresponding to the required valve opening θr, and instruct current supply to the electric actuator based on the calculated current value Ia so as to bring an opening θ of the bleed-off valve to the calculated required valve opening θr;
compare the current value Ia with a predetermined current value Ib, estimate that the bleed-off valve has failed if the current value Ia exceeds the predetermined current value Ib, calculate a current value Ic when the bleed-off valve is estimated to have failed and instruct current supply to the electric actuator based on the calculated current value Ic so as to enlarge the opening θ of the bleed-off valve toward a wide-open opening θw;
calculate a current value Id and instruct current supply to the electric actuator based on the calculated current value Id so as to decrease the opening θ of the bleed-off valve from the wide-open opening θw toward the calculated required valve opening θr; and
compare the supplied current value Id with the predetermined current value Ib and determine the bleed-off valve is normal when the supplied current value Id is equal to or smaller than the predetermined current value Ib.

8. The controller according to claim 7, wherein the processor is configured to determine that the bleed-off valve has failed when the supplied current value Id exceeds the predetermined current value Ib, and continues the supply of current to the electric actuator at the current value Ic.

9. The controller according to claim 8, wherein the processor is configured to continue the supply of current so as to keep the opening θ of the bleed-off valve to the wide-open opening θw when it is determined that the bleed-off valve has failed.

10. The controller according to claim 7, wherein the processor is configured to instruct current supply to the electric actuator based on the calculated current value Ic for a predetermined time period, and calculate the current value Id and instruct the current supply to the electric actuator based on the calculated current value Id after expiration of the predetermined time period.

11. The controller according to claim 7, wherein the processor is configured to calculate the current value Ia and the current value Ic in accordance with characteristics preset with respect to output of the electric actuator.

12. The controller according to claim 11, wherein current value increases with increasing output of the electric actuator.

13. A method for controlling a bleed-off valve drive controller for an aircraft gas turbine engine equipped with at least a single spool compressor and turbine which obtains thrust from output generated by driving the turbine with high-temperature, high-pressure gas produced by combusting fuel with compressor-compressed intake air in a combustion chamber;
a bleed-off valve that bleeds the intake air compressed by the compressor exterior; and
an electric actuator that drives the bleed-off valve to open or close when current is supplied;
the method comprising steps of:
calculating a required valve opening θr required under an operating condition of the engine and a current value Ia corresponding to the required valve opening θr, and instructing current supply to the electric actuator based on the calculated current value Ia so as to bring an opening θ of the bleed-off valve to the calculated required valve opening θr;
comparing the current value Ia with a predetermined current value Ib, estimating that the bleed-off valve has failed if the current value Ia exceeds the predetermined current value Ib, calculating a current value Ic when the bleed-off valve is estimated to have failed and instructing current supply to the electric actuator based on the calculated current value Ic so as to enlarge the opening θ of the bleed-off valve toward a wide-open opening θw;
calculating a current value Id and instructing current supply to the electric actuator based on the calculated current value Id so as to decrease the opening θ of the bleed-off valve from the wide-open opening θw toward the calculated required valve opening θr; and
comparing the supplied current value Id with the predetermined current value Ib and determining the bleed-off valve is normal when the supplied current value Id is equal to or smaller than the predetermined current value Ib.

14. The method according to claim 13, the further comprising steps of determining the bleed-off valve has failed when the supplied current value Id exceeds the predetermined current value Ib, and continuing a supply of current to the electric actuator at the current value Ic.

15. The method according to claim 14, wherein the supply of current is continued at the current value Ic so as to keep the opening θ of the bleed-off valve to the wide-open opening θw when it is determined that the bleed-off valve has failed.

16. The method according to claim 13, wherein the step of instructing current supply to the electric actuator based on the calculated current value Ic comprises instructing current supply to the electric actuator based on the calculated current value Ic for a predetermined time period, and the step of instructing current supply to the electric actuator based on the calculated current value Id comprises instructing current supply to the electric actuator based on the calculated current value Id after expiration of the predetermined time period.

17. The method according to claim 13, wherein the current value Ia and the current value Ic are calculated in accordance with the electric actuator.

18. The method according to claim 17, wherein current value increases with increasing output of the electric actuator.

* * * * *